US008623436B2

(12) United States Patent
Legner

(10) Patent No.: US 8,623,436 B2
(45) Date of Patent: Jan. 7, 2014

(54) COFFEE BREWING METHOD

(76) Inventor: Gary Legner, Phoenix, AZ (US)

(*) Notice: Subject to any disclaimer, the term of this patent is extended or adjusted under 35 U.S.C. 154(b) by 434 days.

(21) Appl. No.: 12/901,839

(22) Filed: Oct. 11, 2010

(65) Prior Publication Data

US 2012/0088014 A1  Apr. 12, 2012

(51) Int. Cl.
*A23F 5/26* (2006.01)

(52) U.S. Cl.
USPC .................. 426/78; 426/84; 426/433

(58) Field of Classification Search
USPC .............................. 426/78, 84, 433
See application file for complete search history.

(56) References Cited

U.S. PATENT DOCUMENTS

| | | | | |
|---|---|---|---|---|
| 1,405,662 A | * | 2/1922 | Biette | 99/306 |
| 1,489,893 A | * | 4/1924 | Malcamp | 99/299 |
| 1,553,732 A | * | 9/1925 | Weinberg | 99/306 |
| 2,120,860 A | * | 6/1938 | Ehlers | 99/303 |
| 3,971,305 A | * | 7/1976 | Daswick | 99/295 |
| 3,985,069 A | | 10/1976 | Cavalluzzi | |
| 4,446,158 A | | 5/1984 | English et al. | |
| 4,697,502 A | | 10/1987 | English et al. | |
| 5,249,509 A | | 10/1993 | English | |
| 6,645,537 B2 | | 11/2003 | Sweeney et al. | |
| 2007/0262015 A1 | | 11/2007 | Lotzsch et al. | |
| 2009/0095164 A1 | | 4/2009 | Celeste | |

FOREIGN PATENT DOCUMENTS

| | | |
|---|---|---|
| DE | 202004002691 | 6/2005 |
| DE | 202004008707 | 8/2005 |
| EP | 1502526 | 2/2005 |
| FR | 2641688 | 7/1990 |

* cited by examiner

*Primary Examiner* — Anthony Weier
(74) *Attorney, Agent, or Firm* — Weiss & Moy, P.C.; Jeffrey D. Moy

(57) ABSTRACT

An improved coffee brewing apparatus and method is shown. The method can include setting a permeable disk over coffee grounds in the filter of a conventional drip coffee maker, placing water on the permeable disk, and compressing the coffee grounds with a weight of the water on the permeable disk. The method can include percolating the coffee grounds with the water distributed uniformly with the permeable disk for brewing a coffee beverage. The method can also include passing the coffee beverage to an outlet. The method, in one embodiment, can include mixing contents within a booster pack to the coffee beverage.

4 Claims, 3 Drawing Sheets

COFFEE BREWING METHOD

TECHNICAL FIELD

This application generally relates to brewed drinks, and more particularly, to methods of preparing coffee using a multi-sized water channeling and distribution device that preferably includes three-layers of material for flavor extraction.

BACKGROUND

Coffee is brewed by placing water into contact with ground, roasted coffee. Optimal flavor is a result of the water, temperature, time and pressure used. Coffee beans typically contain approximately 600 chemical compounds, a high percentage of which result in bitter and poor tasting coffee. These undesirable compounds are normally released into brewed coffee when the water remains in contact with the ground coffee beans for relatively long durations.

Numerous methods of brewing coffee exist to generate optimal flavors. The simplest form of preparing coffee is to boil coffee grounds using hot water. Generally, the brewed coffee rises to the top while the coffee grounds sink to the bottom of the cup. In a process known as "steeping", coffee grounds are placed in pre-heated water and left there for a few minutes. It is important to add coffee grounds quickly after grinding. For small amounts of coffee, two or three minute steep times would be appropriate. For larger quantities, four minutes is typically sufficient. A plunger is pushed down allowing the steeped coffee to enter the serving chamber while a filter retains the grounds.

In espressos or other similarly related drinks, pressure is used to brew the coffee grounds. Drip brewing produces coffee by allowing hot water to drip over coffee grounds held in by a coffee filter surrounded by a brew basket. Strength of the coffee varies according to the ratio of water to coffee grounds used.

When brewing coffee, water is poured into a filter basket/container and travels through the coffee grounds as fast as gravity will allow. There is no universal tool or device that collects, manages and distributes the water flow in an efficient manner. Some of the causes and impacts include coffee maker design, the flow of water into the coffee filter basket is inconsistent due to various, types of water distribution nozzles, inconsistent distribution of water jeopardizes the 'equal saturation' of all, coffee grounds, and the percolating process is impacted.

A flaw in the coffee brewing process prevents "the best possible" coffee from being consistently made as neither the proper water, temperature, time and pressure is used. This flaw impacts all the flavor and aroma profiles of brewed coffee, and wastes money. A need therefore exists for a coffee brewing method that helps to eliminate the rapid gravity flow of water through the coffee grounds and distributes the water evenly and consistently over the coffee grounds.

SUMMARY

This summary is provided to introduce a selection of concepts in a simplified form that are further described below in the DESCRIPTION OF THE APPLICATION. This summary is not intended to identify key features of the claimed subject matter, nor is it intended to be used as an aid in determining the scope of the claimed subject matter.

In accordance with one aspect of the present application, a method for preparing coffee is provided. The method can include setting a permeable disk over coffee grounds, placing water on the permeable disk, and collecting and uniformly distributing the water on the permeable disk. In addition, the method can include compressing the coffee grounds with a weight of the water on the permeable disk. The method can also include percolating the coffee grounds with the water permeating evenly through the permeable disk for brewing a coffee beverage. The method can include passing the coffee beverage to an outlet.

In accordance with another aspect of the present application, a coffee brewing method is provided. The method can include receiving water, collecting the water evenly on a porous covering, and compressing an entire surface of coffee grounds under the porous covering with the collected water. In addition, the method can include percolating the coffee grounds with the water.

In accordance with yet another aspect of the present application, a water permeable filter is provided. The water permeable filter can include a multi-layer material covering coffee grounds. Water can collect on a top surface of the material compressing the coffee grounds with the water uniformly seeping on a bottom surface of the material percolating the coffee grounds.

BRIEF DESCRIPTION OF DRAWINGS

The novel features believed to be characteristic of the application are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The application itself, however, as well as a preferred mode of use, further objectives and advantages thereof, will be best understood by reference to the following detailed description of illustrative embodiments when read in conjunction with the accompanying drawings, wherein;

DESCRIPTION OF THE APPLICATION

The description set forth below in connection with the appended drawings is intended as a description of presently preferred embodiments of the application and is not intended to represent the only forms in which the present application can be constructed and/or utilized. The description sets forth the functions and the sequence of steps for constructing and operating the application in connection with the illustrated embodiments. It is to be understood, however, that the same or equivalent functions and sequences can be accomplished by different embodiments that are also intended to be encompassed within the spirit and scope of this application.

Generally described, the present application relates to brewed drinks, and more particularly, to coffee brewing methods using a permeable disk. In one illustrative embodiment, the method can include setting the permeable disk over coffee grounds in the filter of a conventional drip coffee maker, placing water on the permeable disk, and compressing the coffee grounds with a weight of the water on the permeable disk. The method can include percolating the coffee grounds with the water distributed uniformly with the permeable disk for brewing a coffee beverage. The method can also include passing the coffee beverage to an outlet.

By providing the correct application of water, temperature, time and pressure, optimal flavor from the coffee grounds can be realized. Furthermore, undesirable compounds normally found within the ground coffee remain and are not released into the brewed coffee. While primarily described with a percolating process, those skilled in the relevant art will appreciate that the methods described herein can be extended to other types of brewing processes such as steeping. Numerous advantages will become apparent from the description provided below.

Figure 1:
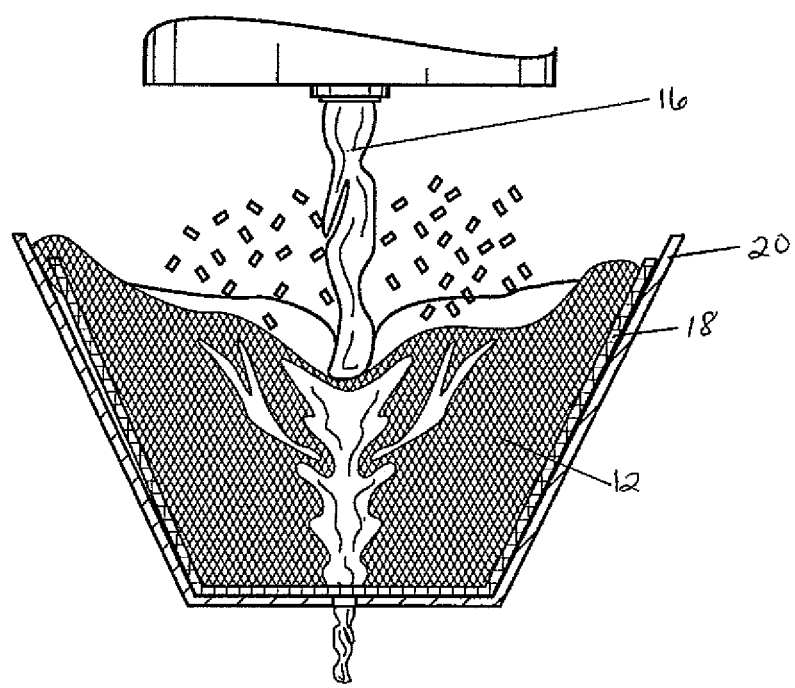
FIG. 1 is a diagram of the prior art showing how coffee is brewed today.

FIG. 1 shows how coffee is brewed in conventional drip coffee machines. A coffee filter 18 is typically placed in the filter basket 20 and ground coffee 12 is placed into the filter 18. Hot water 16 is poured directly onto the ground coffee 12, typically in the center of the filter 18, and the hot water 16 flows through the ground coffee 12, picking up their flavor and oil on the way down to the coffee pot.

As depicted, the prior art brewing method is not optimal. When the hot water 16 is placed into the center of the ground coffee 12, the ground coffee 12 can splatter to the sides of the filter basket 20, potentially causing spills into the collection pot below. Moreover, the hot water 16 typically leaves a hole within the center of the grounds 12 such that only a certain portion of the grounds 12 are actually percolated causing the flavor to be bitter. In an uneven distribution, some grounds 12 are never properly soaked.

A conventional French coffee press is a popular device used for brewing coffee. Because the coffee grounds remain in direct contact with the brewing water and the grounds are filtered from the water via a mesh instead of a paper filter, coffee brewed with a French press captures more of the coffee's flavor and essential oils, which would become trapped in a traditional drip brew machine's paper filters. As demonstrated with a French press, brewing coffee optimally occurs with the right settings of water, temperature, time, and pressure. The methods described herein help to accomplish a similar result with the use of a permeable disk 10 with almost any conventional drip coffee maker.

Figure 2:
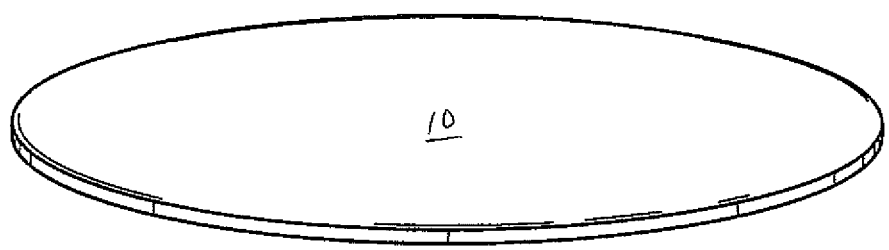
FIG. 2 is an exemplary permeable disk angled at 45 degrees in accordance with one embodiment of the present application.
Figure 3:
FIG. 3 is a side view or cut-away view of the exemplary permeable disk thereof.

One type of permeable disk 10 that can be used in the method of the present application is shown in FIGS. 2-3. FIG. 2 is an exemplary permeable disk 10 angled at 45 degrees. As shown in FIG. 3, the permeable disk 10 has multiple layers, preferably three, which can include, but are not limited to, paper towels or some other suitable material. In a preferred embodiment, the paper towels are provided in two ply, which can be made by Bounty®, Brawny® or the like. The outer diameter of the permeable disk 10 can be sealed and further designed to direct incoming water away from the sides of the filter basket 20. A number of different layers can be used and be made up of different compositions. Known to those skilled in the art, the amount of water that permeates the disk 10 is dependent on the number of layers as well as their thickness.

The permeable disk 10 can be constructed of a variety of materials. For example, disposable paper can be used. The disposable paper can be biodegradable. Often, the disk 10 can be made of unbleached paper removing any unwanted chemicals. Metal disks 10, in one embodiment, can be implemented. The metal can be molded into mesh. Plastic or other type of polymer disks 10 can be used as well. In one embodiment, cloth can be used to construct the permeable disk 10. Known to those skilled in the relevant art, the disk 10 can be made of a combination of those materials described above. The material is constructed such that it can collect water on a top surface and distribute it uniformly on a bottom surface.

The permeable disk 10 can be referred to, within the present application, as a porous covering, water permeable filter, etc. The covering 10 can take on numerous shapes and sizes to conform to the filter basket 20 and is not limited to a disk shape. For example, in one embodiment, the covering 10 can take the shape of a square, which can be adapted for use within filter baskets 20 known to those skilled in the art. Generally, the covering 10 is placed directly over the coffee grounds 12 such that it touches the grounds 12.

Figure 6:
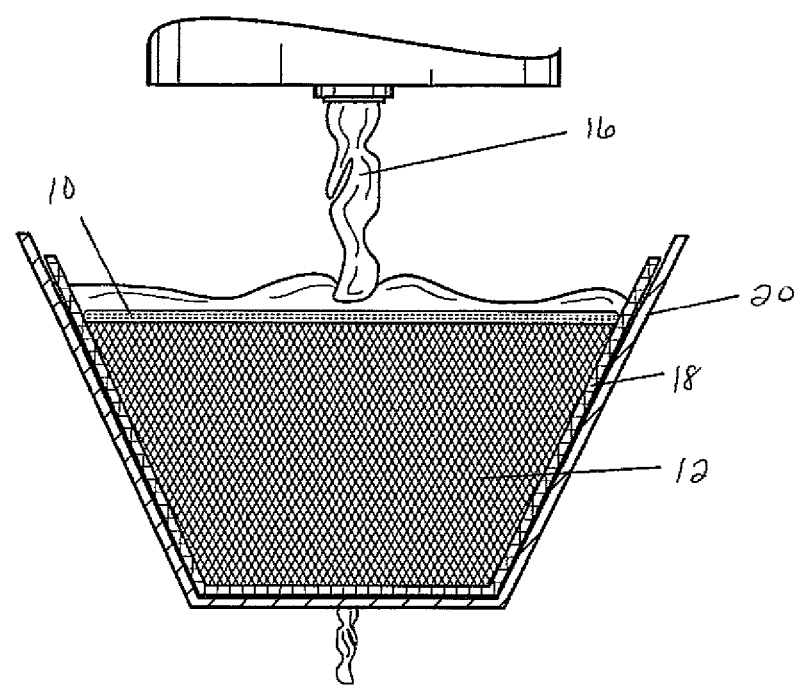
FIG. 6 is a diagram showing an illustrative coffee brewing method using the exemplary permeable disk in accordance with one aspect of the present application.

Turning now to FIG. 6, a diagram showing an illustrative coffee brewing method using the exemplary permeable disk 10 in accordance with one aspect of the present application is provided. The method can include setting the permeable disk 10 over coffee grounds 12. Water 16 can then be placed on the permeable disk 10. When brewed, the water 16 is typically poured onto a single location on the permeable disk 10, which is often at its center. A closed-wall vessel can be used to brew the coffee.

The method can include heating the water 16 before placement on the permeable disk 10. Known to those skilled in the relevant art, the water 16 can be heated in a number of different ways. The permeable disk 10 can collect the water 16 above the coffee grounds 12 and can prevent rapid gravity flow of the water 16 through the coffee grounds 12. Generally, the water 16 above the permeable disk 10 collects evenly or uniformly.

The weight of the water 16 on top of the permeable disk 10 can compress the coffee grounds. By compressing the coffee grounds 12, pressure is applied making for better brewed coffee. The compression can take place uniformly throughout the coffee grounds 12 through the water collected on the top of the permeable disk 10 and distributed uniformly from the top.

Figure 7:
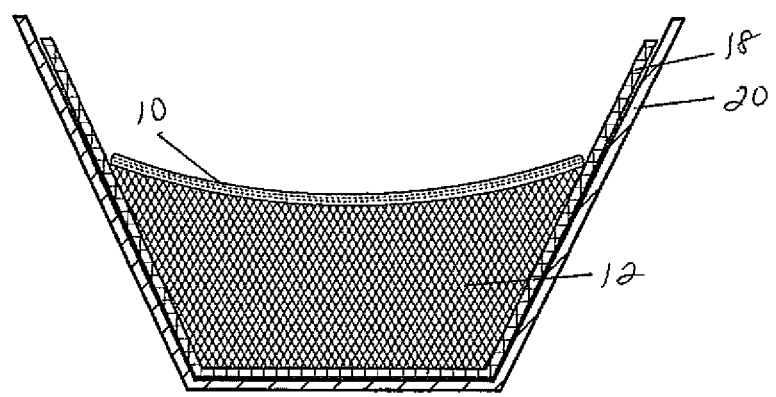
FIG. 7 is a diagram showing a completion of the illustrative brewing method using the permeable disk thereof.

As the water 16 begins to seep through the permeable disk 10, the water 16 can begin percolating the coffee grounds 12. The water 16 from the permeable disk 10 is typically distributed uniformly for brewing a coffee beverage. Generally, water 16 is poured into the filter basket 20, while concurrently, water 16 is percolating the coffee grounds when passing through the permeable disk 10. As a result, the coffee grounds 12 are not only compressed but brewed at the same time. FIG. 7 is a diagram showing a completion of the illustrative brewing method using the permeable disk 10.

After the coffee grounds 12 are brewed, the coffee grounds 12 are removed using known methods such as the filter 18 described above. The coffee beverage can be passed to an outlet. In one embodiment, a receptacle is placed below the outlet to capture the coffee.

Numerous trials were done to determine optimal performance. When one layer of material was used, the disk 10 weighed 0.39 grams when dry and 5.90 grams when wet. A two-layer disk 10 weighed 0.80 grams when dry and 12.19 grams when wet. A three-layer disk 10 weighed 1.20 grams when dry and 18.27 grams when wet. A four-layer disk 10 weighed 1.60 grams when dry and 24.25 grains when wet and a five-layer disk 10 weighed 1.99 grams when dry and 30.42 grams when wet.

Measurements of the compression to the ground coffee 12 were taken using the different layered disks 10. To detect the compression for each disk 10, the filter basket 20 was filled with 0.85 inches of coffee. When a one-layer disk 10 was used, the ground coffee 12 was compressed to about 0.75 inches. A two-layer disk 10 compressed the ground coffee 12 to 0.70 inches and the three-layer disk 10 compressed the ground coffee 12 to 0.50 inches. A four-layer disk 10 compressed the ground coffee 12 to 0.49 inches.

With a one-layer disk 10 the steeping and compression of the coffee grounds 12 was at 14%. The two-layer disk 10 was at 21% and the three-layer disk 10 was at 39%. Interestingly, the tests showed 39% steeping and compression with the four-layer disk 10. As a result, the trials predicted that the three-layer disk 10 would optimally compress the ground coffee 12.

Figure 4:
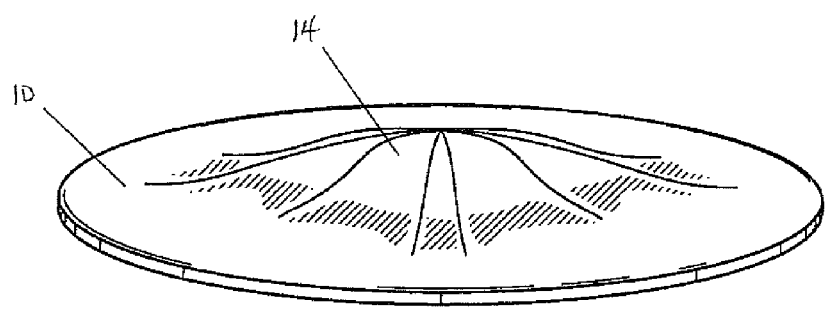
FIG. 4 is a 45 degree sketch of an exemplary permeable disk having a booster pack in accordance with one embodiment of the present application.
Figure 5A:
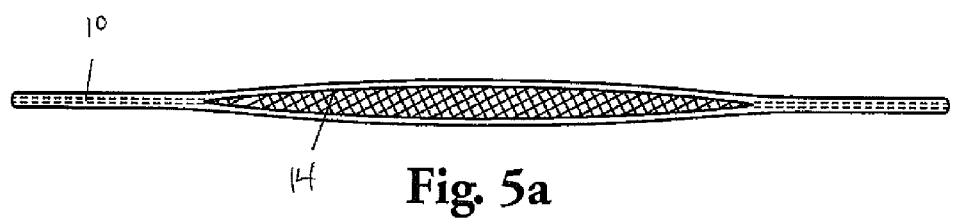
FIG. 5A is a side view or cut-away view of the exemplary permeable disk having a filter booster pack using coffee thereof.
Figure 5B:
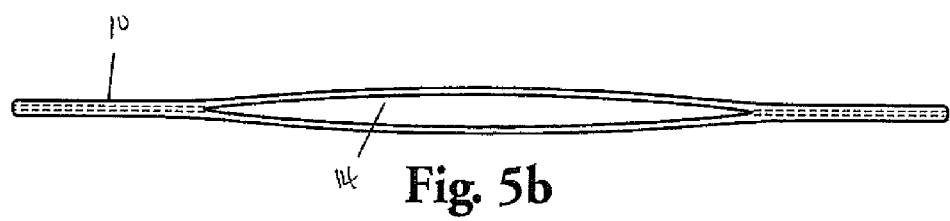
FIG. 5B is a side view or cut-away view of the exemplary permeable disk having a filter booster pack using either flavorings or vitamins thereof.

A booster pack within the permeable disk 10 can be provided. FIG. 4 is a 45 degree sketch of an exemplary permeable disk 10 having a booster pack 14 in accordance with one embodiment of the present application. FIG. 5A shows a booster pack 14 wherein the contents of the booster pack 14 is coffee. The coffee placed within the booster pack 14 can be more expensive coffee. FIG. 5B shows a booster pack 14 wherein the contents can be flavorings or vitamins. These can include flavorings such as vanilla, hazelnut, etc. In one embodiment, the booster pack 14 can include flavorings such as an Espresso shot additive or the like.

In one embodiment, when the water 16 begins seeping through the disk 10, the contents of the booster pack 14 are mixed therein. The booster pack 14 can be filled by a manufacturer or the user.

In accordance with one aspect of the present application, a method for preparing coffee is provided. The method can include setting a permeable disk over coffee grounds, placing water on the permeable disk, and collecting and uniformly distributing the water on the permeable disk. In addition, the method can include compressing the coffee grounds with a weight of the water on the permeable disk. The method can also include percolating the coffee grounds with the water permeating evenly through the permeable disk for brewing a coffee beverage. The method can include passing the coffee beverage to an outlet.

In one embodiment, the method can include heating the water before placement on the permeable disk. In one embodiment, the method can include filtering the coffee beverage from the coffee grounds. In one embodiment, placing the water on the permeable disk can include dispensing the water on a single location on the permeable disk.

In one embodiment, percolating the coffee grounds with the water can include passing the water over an entire surface of the coffee grounds. In one embodiment, the coffee grounds can be compressed uniformly with the permeable disk. In one embodiment, the weight of the water can be distributed uniformly over the permeable disk.

In one embodiment, the coffee beverage can be brewed in a closed-wall vessel. In one embodiment, the permeable disk can be in direct contact with the coffee grounds. In one embodiment, the method can include distributing the coffee beverage to a coffee receptacle placed below the outlet.

In accordance with another aspect of the present application, a coffee brewing method is provided. The method can include receiving water, collecting the water evenly on a porous covering, and compressing an entire surface of coffee grounds under the porous covering with the collected water. In addition, the method can include percolating the coffee grounds with the water.

In one embodiment, collecting the water can remove rapid gravity flow of the water. In one embodiment, compressing the entire surface of the coffee grounds can include applying uniform pressure to said coffee grounds. In one embodiment, the method can include adding contents within a booster pack on said porous covering when percolating said coffee grounds. In one embodiment, the contents can include coffee, flavorings, or vitamins.

In accordance with yet another aspect of the present application, a water permeable filter is provided. The water permeable filter can include a multi-layer material covering coffee grounds. Water can collect on a top surface of the material compressing the coffee grounds with the water uniformly seeping on a bottom surface of the material percolating the coffee grounds.

In one embodiment, the material can include disposable paper, metal, plastic, or cloth. In one embodiment, the water permeable filter can include a pack placed within the multi-layer material, wherein the water is mixed with contents of the pack as the water seeps through the material. In one embodiment, the contents can be Espresso shot additives. In one embodiment, the multi-layer material can include three sheets of material.

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A coffee brewing method comprising:
placing a porous covering on top of coffee grounds;
receiving water;
collecting said water evenly on said porous covering;
compressing an entire surface of said coffee grounds by said porous covering with said collected water;
percolating said coffee grounds with said water; and
adding contents within a booster pack on said porous covering when percolating said coffee grounds.

2. The coffee brewing method of claim 1, wherein collecting said water evenly on a porous covering removes rapid gravity flow of said water.

3. The coffee brewing method of claim 1, wherein compressing said entire surface of said coffee grounds comprises applying uniform pressure to said coffee grounds.

4. The coffee brewing method of claim 1, wherein said contents comprise coffee, flavorings, or vitamins.

* * * * *